United States Patent [19]

Ikeda et al.

[11] Patent Number: 4,729,036
[45] Date of Patent: Mar. 1, 1988

[54] ORIGINAL READING APPARATUS AND ORIGINAL READING AND RECORDING APPARATUS USING THE SAME

[75] Inventors: Takeshi Ikeda, Yokohama; Kazuya Ijuin, Tokyo, both of Japan

[73] Assignee: Canon Kabushiki Kaisha, Tokyo, Japan

[21] Appl. No.: 804,310

[22] Filed: Dec. 3, 1985

[30] Foreign Application Priority Data

| Dec. 4, 1984 | [JP] | Japan | 59-225124 |
| Dec. 4, 1984 | [JP] | Japan | 59-225125 |
| Dec. 4, 1984 | [JP] | Japan | 59-225126 |
| Dec. 4, 1984 | [JP] | Japan | 59-225127 |
| Dec. 4, 1984 | [JP] | Japan | 59-225128 |

[51] Int. Cl.$^4$ .............. H04N 1/21; H04N 1/23; G01D 15/10
[52] U.S. Cl. .................. 358/296; 358/285; 346/76 PH
[58] Field of Search .............. 358/285, 296; 346/76 PH

[56] References Cited

U.S. PATENT DOCUMENTS

| 4,266,251 | 5/1981 | Hara et al. | 358/285 X |
| 4,581,657 | 4/1986 | Takano | 358/285 |
| 4,625,218 | 11/1986 | Watanabe | 346/76 PH |

FOREIGN PATENT DOCUMENTS 1471382 4/1977 United Kingdom .

Primary Examiner—E. A. Goldberg
Assistant Examiner—Patrick W. Foster
Attorney, Agent, or Firm—Fitzpatrick, Cella, Harper & Scinto

[57] ABSTRACT

An original reading apparatus of this invention has a platen roller for conveying an original, a solid state image sensor, a small imaging element array for forming the image of the original on the solid state image sensor, and a plate for holding down the original against the platen roller.

12 Claims, 20 Drawing Figures

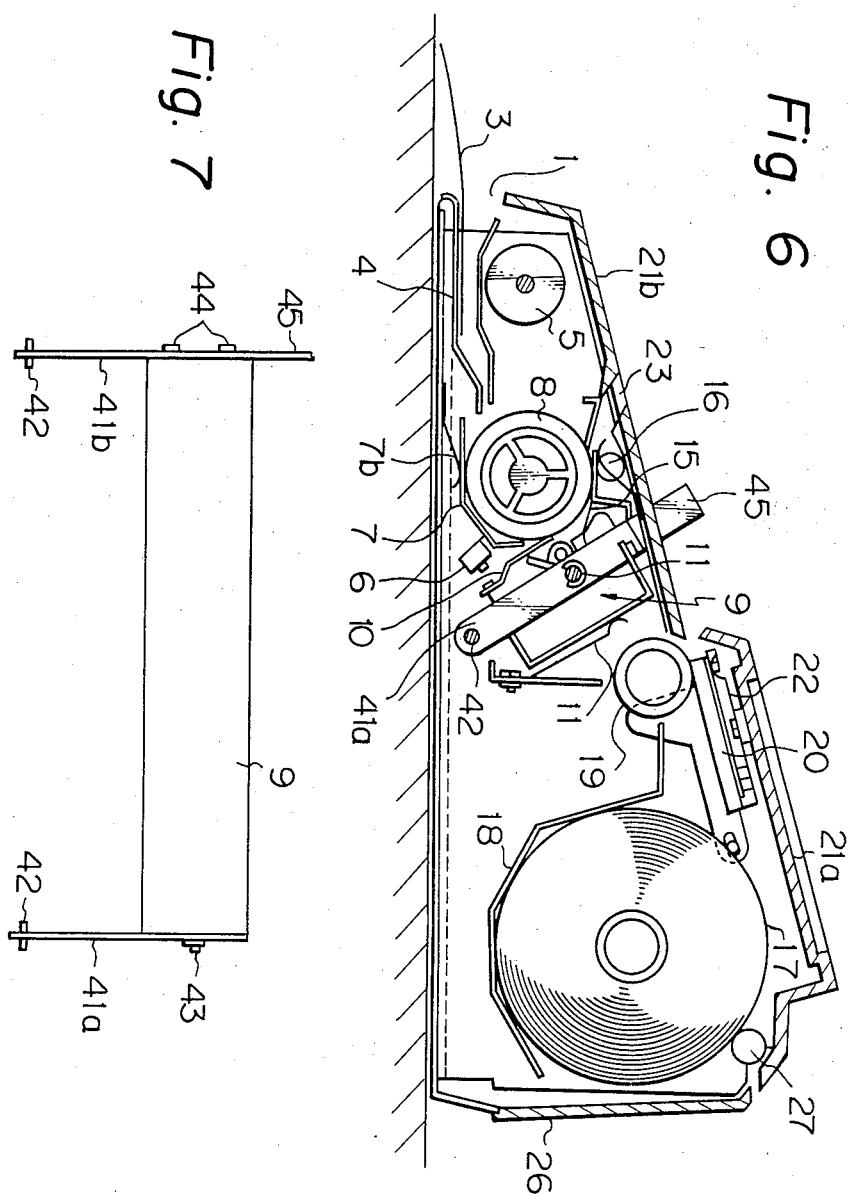

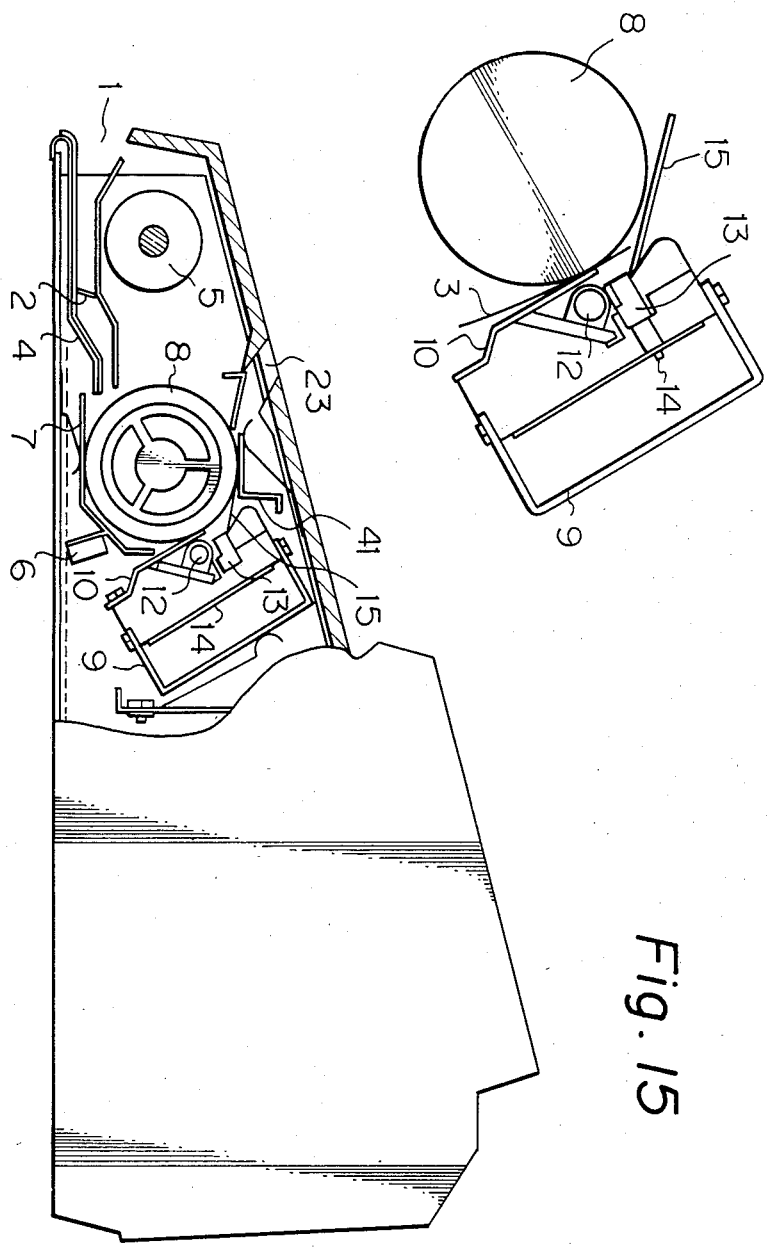

ORIGINAL READING APPARATUS AND ORIGINAL READING AND RECORDING APPARATUS USING THE SAME

BACKGROUND OF THE INVENTION

1. Field of the Invention

This invention relates to an original reading apparatus for converting the information of an original into an electrical signal, and to an original reading and recording apparatus having such original reading apparatus and a recording apparatus for reproducing the image of the original from a received original information signal.

2. Description of the Prior Art

In an original reading apparatus, it has heretofore been usual that, as shown in FIG. 1 of the accompanying drawings, use is made of an original conveying system 37 for moving an original 3 substantially rectilinearly by means of rollers 36 or the like and an original reading system 39 for projecting the optical image of the original onto a solid state image sensor 14 through the intermediary of a mirror 38 and a lens 38', but such an apparatus has suffered from a disadvantage of bulkiness.

Also, in the apparatus of FIG. 1, the original reading system 39 is disposed below the original conveying system 37, and a recording system 40 for reproducing the image on a recording medium 17 by means of a recording head 20 is disposed laterally of the original reading system, but such disposition of the systems has also caused the apparatus to be bulky.

SUMMARY OF THE INVENTION

It is an object of the present invention to provide an original reading apparatus which can be easily made compact.

It is another object of the present invention to provide an original reading apparatus which can be easily made compact and yet enables original reading with good accuracy.

It is still another object of the present invention to provide an original reading and recording apparatus which can be easily made compact.

Other objects and features of the present invention will become apparent from the following detailed description taken in conjunction with the accompanying drawings.

BRIEF DESCRIPTION OF THE DRAWINGS

FIG. 6 is a cross-sectional view of the preferred embodiment of the present invention.

FIG. 7 is a front view of the essential portions of the FIG. 6 embodiment.

FIG. 14 illustrates the essential portions of a preferred embodiment of the present invention.

FIG. 15 is a partly cross-sectional view of an embodiment using the apparatus of FIG. 14.

DESCRIPTION OF THE PREFERRED EMBODIMENTS

Figure 1:
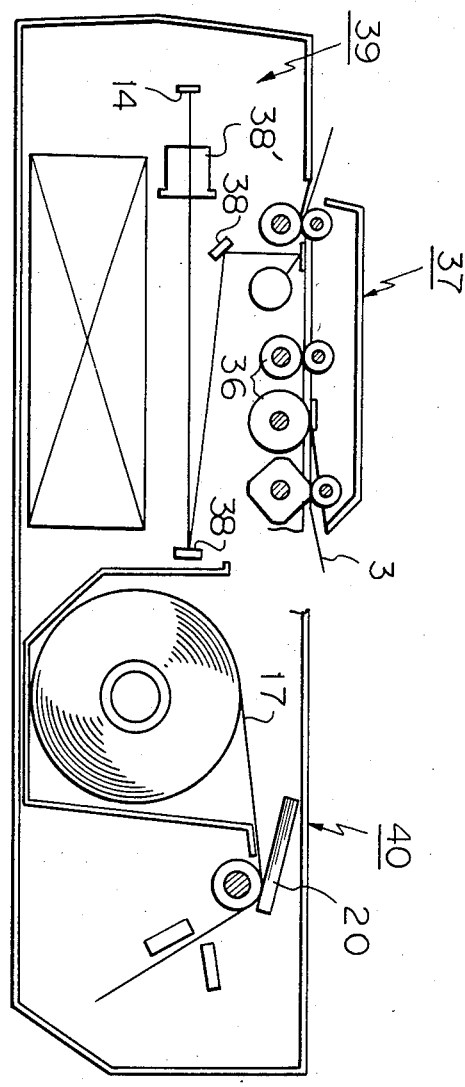
FIG. 1 illustrates an example of the prior art.
Figure 2:
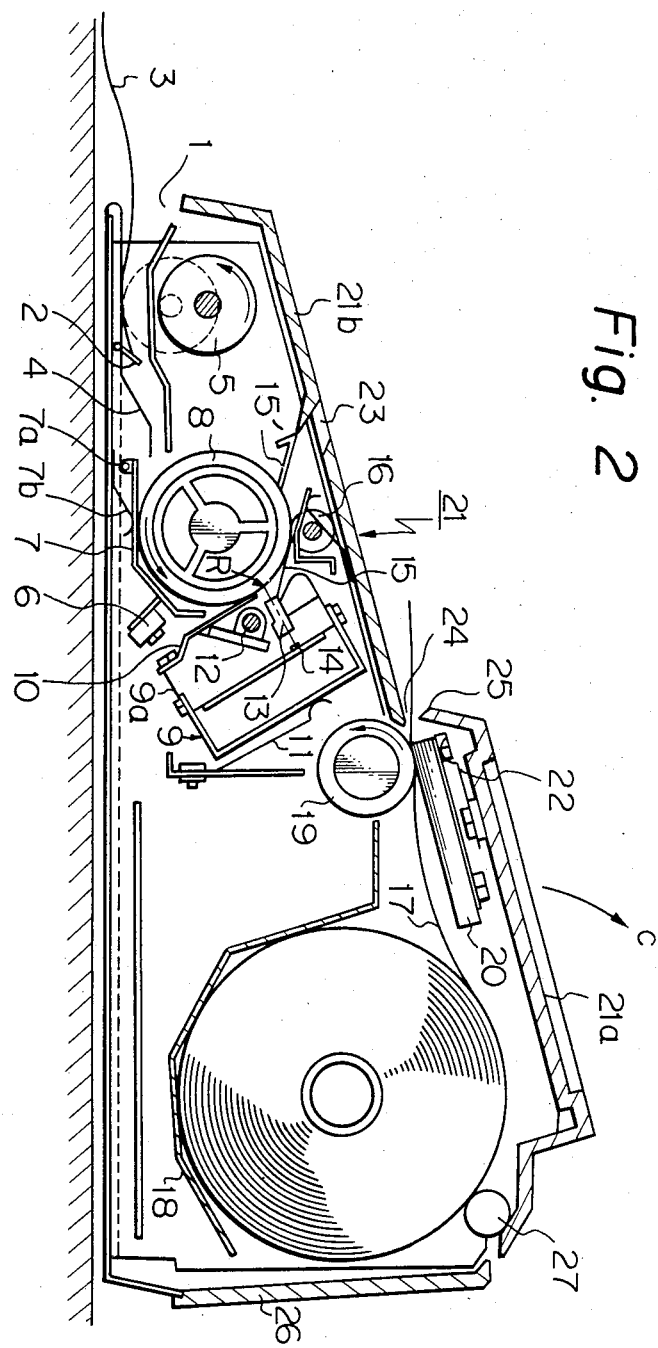
FIG. 2 is a cross-sectional view of an embodiment of the present invention.
Figure 3:
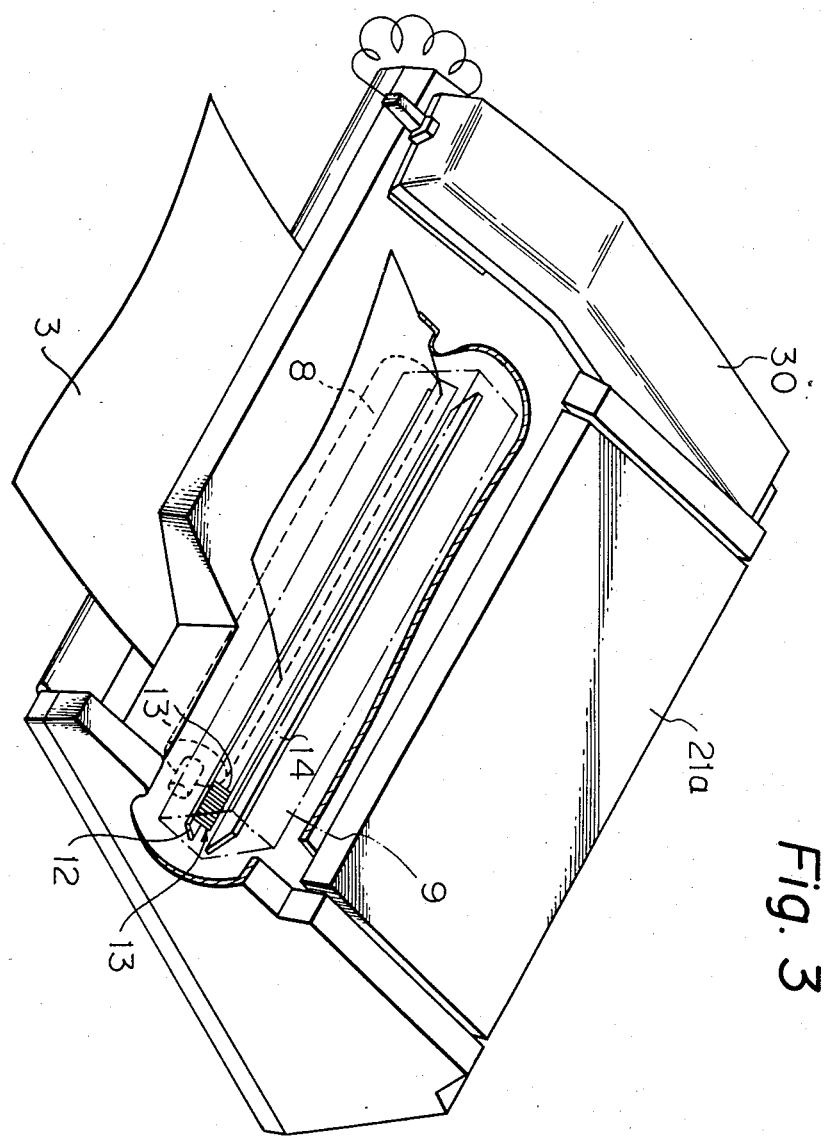
FIG. 3 is a perspective view of an embodiment of the present invention with a portion thereof broken away.

Referring to FIG. 2 which shows a facsimile apparatus to which the present invention is applied, the left side is the forward portion and the right side is the rearward portion. An original insertion port 1 is provided in the lower part of the forward portion, and an original detecting sensor 2 and a pick-up roller 5 adapted to be lowered by the signal of the sensor 2 and press an original 3 and cooperable with a lower guide 4 to convey the original 3 rightwardly are provided near the insertion port 1. The original is supplied to a position below a platen roller 8.

An original leading end detecting sensor 6 for detecting the leading end of the conveyed original 3 is provided rearwardly of the pick-up roller 5, and platen roller 8 cooperates with a lower guide 7 to convey the original 3 at a constant speed. The lower guide 7 being pivotable about a shaft 7a and having its underside surface biased upwardly by a plate spring 7b. The platen roller 8 is rotatively driven in the direction of the curved arrow by a motor, not shown. That surface of the original which is opposite to the surface to be read is opposed to the roller 8.

The original conveyed upwardly by the platen roller 8 is opposed to a reading assembly 9. This assembly 9 has a solid state image sensor 14 for converting the optical image of the original into an electrical signal, an imaging optical system 13 for forming the optical image of the original on the solid state image sensor 14, and an original holding-down plate 10 for holding down the original against the platen roller 8, and preferably further has an original illuminating light source 12. The sensor 14, the optical system 13, the holding-down plate 10 and the light source 12 are supported by a frame member 9a which is a base member. The assembly 9 is movably supported by a mechanism to be described, and is resiliently biased toward the roller 8 by a spring 11 so that the holding-down plate 10 bears against the roller 8 and the optical system 13 is opposed to the roller 8. The optical system 13 need not always be used, the sensor 14 instead being directly opposed to the original.

The original which has come to the position of the holding-down plate 10 is conveyed by the rotation of the roller 8 while being nipped between the roller 8 and the plate 10, and this is because the friction force between the original and the roller 8 is greater than the friction force between the original and the plate 10. A roller of a small diameter may be used instead of the plate 10, but a plate is simpler than a roller, and the floating of the original from the platen roller 8 can be sufficiently prevented by holding down the original by the plate 10.

The original advances along the rotational path of the platen roller 8 while being further guided by a guide 15 and a roller 16, and is separated from the roller 8 at the position of the upper portion of the roller 8 and discharged out of the apparatus through a discharge port 23. Designated by 15' is a guide for separating the original from the roller 8.

The term "upper portion of the roller" refers to the peripheral surface portion of the roller 8 above a horizontal plane containing the center of rotation of the roller 8, and the term "lower portion of the roller" refers to the peripheral surface portion of the roller below said horizontal plane.

Now, the imaging optical system 13 of the assembly 9 is a small imaging element array comprising a plurality of small imaging elements 13' (FIG. 4) such as of the refractive index distribution type of imaging elements (commercially available under the trade name of Celfoc from Japan Plate Glass Co., Ltd.) arranged in one or more rows in a direction substantially perpendicular to the direction of conveyance of the original, and the total optical path length H from the original to the sensor may be of the order of 10 to 30 mm. No mirror is necessary in the optical system. The length $L_1$ of the optical system 13 with respect to the direction perpendicular to the direction of conveyance of the original may be of the same degree as the width of the original. (The term "width" of the original refers to the dimension of the original with respect to the direction perpendicular to the direction of conveyance of the original.)

The sensor 14 is a photoelectric conversion element array comprising a number of minute photoelectric conversion elements such as photodiodes arranged in the direction substantially perpendicular to the direction of conveyance of the original, and the length $L_1$ of this photoelectric conversion element array with respect to the direction perpendicular to the direction of conveyance of the original may also be of the same degree as the width of the original. For example, in an apparatus for reading an original of JIS A4 format (having a width $L_2$ of 210 mm), if $L_1$ is of the order of 216 mm and design is made such that information from an area of width $L_3$ (of the order of 208 mm) of the original is converted into an electrical signal, it will be sufficient in practice.

Figure 4:
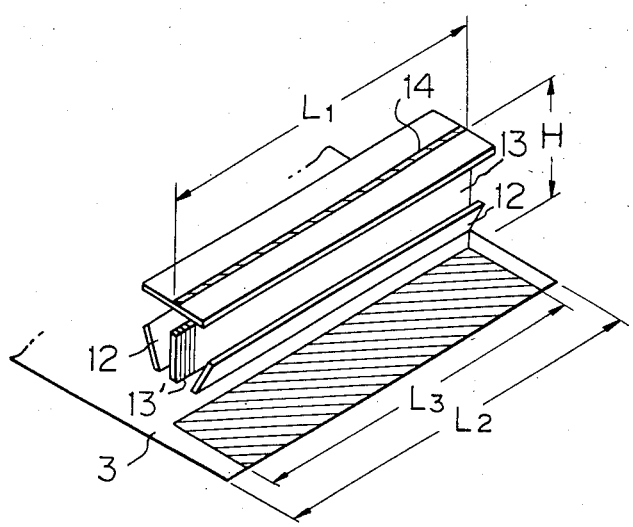
FIG. 4 is a perspective view of the essential portions of an embodiment of the present invention.

The light source 12 may be a fluorescent lamp of a small diameter or the like, but in the present embodiment, use is made of an LED array comprising a number of minute light-emitting diodes arranged in the direction substantially perpendicular to the direction of conveyance of the original, because such array generates little heat and does not adversely affect the sensor 14 by heat. Also, two illuminating light sources 12 may be provided at the opposite sides of the imaging optical system, as shown in FIG. 4.

The light source 12 illuminates the original at a position R downstream of the position at which the fore end portion of the holding-down plate 10 holds down the original against the platen roller 8, with respect to the direction of conveyance of the original. The imaging optical system 13 forms on the sensor 14 the optical image of the original which is at the position R, and the sensor 14 converts this optical image into an electrical signal. The position R should preferably be a position immediately rearward of the position at which the plate 10 holds down the original against the platen roller 8. This is because the position of the original can be stabilized at the position R by making the position at which the plate 10 holds down the original against the roller 8 proximate to the position R. Since the small-diameter imaging element array has a shallow depth of focus, it is desirable that the position of the original be stable at the position R. Accordingly, it is preferable that the position R be selected to such a position at which the back side of the original is still in intimate contact with the roller 8, but this is not requisite.

Figures 5A, 5B:
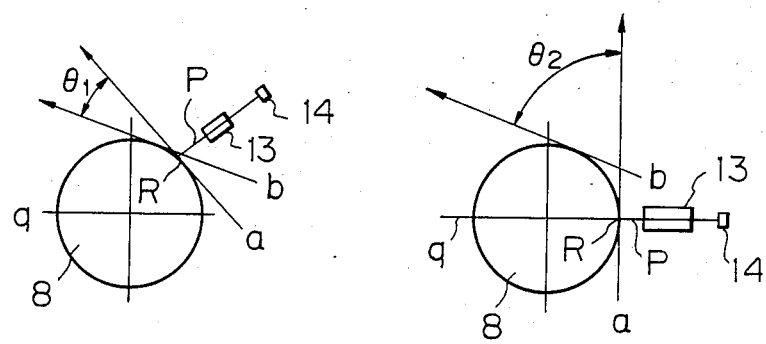
FIGS. 5A and 5B illustrate a preferred embodiment of the present invention.

The angle of mounting of the assembly 9 will now be described in detail. It is preferable to dispose the assembly 9 so that, as shown in FIG. 5A, the original reading position read by means of the imaging optical system 13 and the sensor 14 is the position R above the center of the platen roller 8 and the optical axis P of the imaging optical system 13 forms an acute angle with respect to a horizontal axis q. That is, it is preferable that the imaging optical system 13 be opposed to the platen roller 8 at the position R of the upper portion of the roller 8 and the optical axis P of this optical system 13 be oriented so as to face obliquely downwardly with respect to the roller 8.

In order to clarify the reason therefor, FIG. 5A will be compared with FIG. 5B in which the imaging optical system 13 is disposed on the horizontal axis q. A first advantage is that where the optical axis p forms an acute angle with respect to the horizontal axis q, the entrance end surface of the imaging optical system 13 faces "downwardly" as shown in FIG. 5A, and it becomes more difficult for dust or the like to adhere thereto as compared with the case where the entrance end surface of the imaging optical system 13 is vertical as shown in FIG. 5B. A second advantage is that a space is provided below the platen roller 8 and the assembly 9, making it easy to install the original end portion detecting sensor 6 in this space. A third advantage is concerned with the reaction force (rigidity) of the original 3. That is, if in FIGS. 5A and 5B, the direction of conveyance of the original at the reading position R of the original 3 is a and the direction of separation of the original 3 from the roller 8 is b, the angle formed between the two directions is $\theta_1$ in FIG. 5A and $\theta_2$ in FIG. 5B. Comparing these two angles $\theta_1$ and $\theta_2$, $\theta_1 < \theta_2$. As $\theta$ is made smaller, the reaction force of the original 3 becomes smaller and accordingly, the floating action of the original 3 from the roller 8 becomes smaller, and this is advantageous for the reading of the original 3. Where the small-diameter imaging element array 13 is used, the depth of focus at the original reading position R is as small as 0.1–0.2 millimeter and therefore, it is an important problem to eliminate or reduce the floating action of the original 3 from the roller 8 and stabilize the position of the original in the direction of the optical axis. In this point, it is desirable that $\theta = 0$, but for that purpose, the assembly 9 must be substantially right above the platen roller 8 and in this case, the apparatus becomes thick in the direction of its height, which is not preferable.

In any case, as previously described, the movable reading assembly 9 is resiliently biased by the spring 11 so that the original holding-down member 10 bears against the platen roller 8 and therefore, the positional accuracy of the optical system 13 and the sensor 14 relative to the position R becomes high and original reading at high accuracy becomes possible.

Description will now be made of an example of the mechanism for movably supporting the original reading assembly 9. One end of the assembly 9 (as viewed in the lengthwise direction thereof) is pivotally mounted on a support arm 41a by a shaft 43, and a hole in the arm 41a in which the shaft 43 is fitted is somewhat larger in diameter than the shaft 43, and accordingly, the arm 41a is pivotable in the plane of the drawing sheet of FIG. 7 relative to the assembly 9 and pivotable in a plane perpendicular to the plane of the drawing sheet of FIG. 7 relative to the assembly 9. On the other hand, the other end of the assembly 9 in the lengthwise direction thereof is fixed to a support arm 41b as by two screws 44. Accordingly, the arm 41b is fixed relative to the assembly 9.

The arms 41a and 41b are pivotally supported on a fixed shaft 42 studded in a fixed frame, not shown. Accordingly, the assembly 9 is movable toward and away from the platen roller 8. As shown in FIG. 6 and as previously described, the assembly 9 is resiliently biased by the spring 11 so that the original holding-down plate 10 bears against the roller 8.

Figure 8:
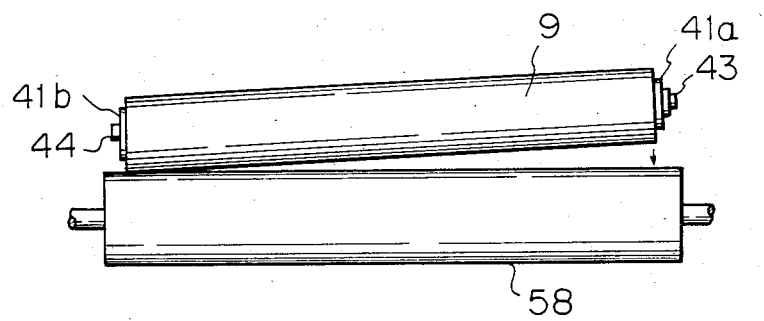
FIG. 8 is a plan view of the essential portions of the FIG. 6 embodiment.
Figure 9:
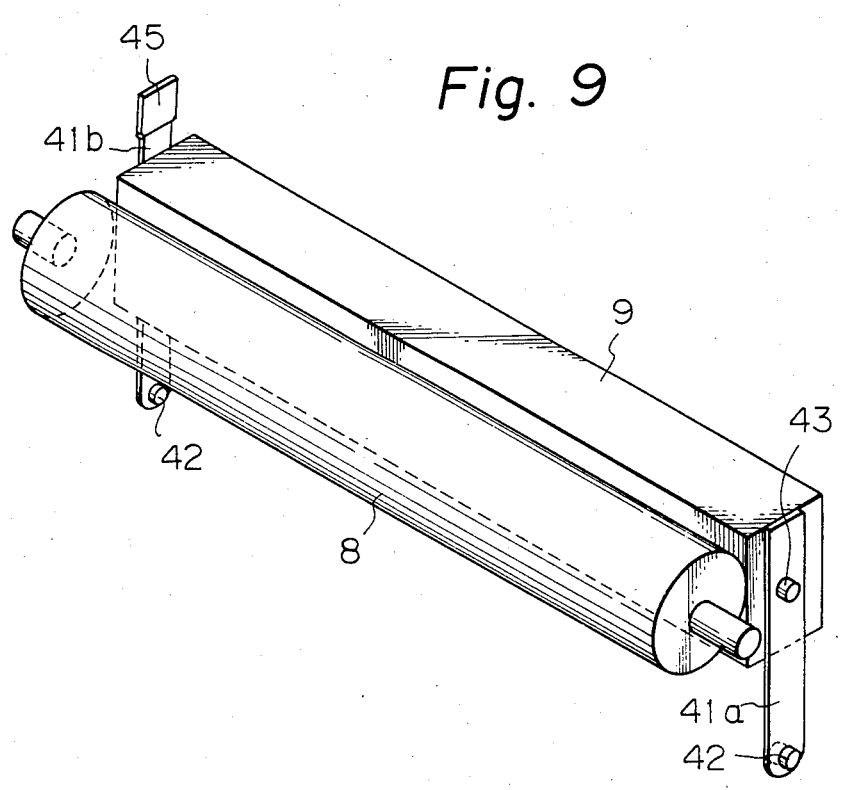
FIG. 9 is a perspective view of the essential portions of the FIG. 6 embodiment.

Now, it is for the following reason that as shown in FIG. 7, one end of the assembly 9 is movably mounted on the arm 41a and the other end thereof is fixed to the arm 41b. The degree of planarity of the table on which the user installs the image reading apparatus is not always guaranteed, and therefore, where the apparatus is installed on a table poor in degree of planarity, the chassis of the apparatus body will be warped and the distance between the imaging optical system 13 of the assembly 9 and the platen roller 8 will vary with respect to the direction of the bus line of the roller 8. This may cause the accuracy of original reading to vary. However, if the assembly 9 is supported in the previously described manner, even if a gap is created between the assembly 9 on the arm 41a side and the platen roller 8 when the assembly 9 positioned on the arm 41b side is caused to bear against the platen roller 8 as shown in FIGS. 8 and 9, the arm 41a is pivoted about the support shaft 42 by the gravity of the assembly 9 and the action of the biasing spring 11 and the assembly 9 pivots about the support shaft 43, whereby the original holding-down plate 10 of the assembly 9 can be made to bear against the platen roller 8 uniformly with respect to the direction of the bus line of the roller. Accordingly, even in a case where the table on which the apparatus is installed is poor in degree of planarity, the gap between the optical system 13 and the platen roller 8 can always be automatically maintained constant with respect to the direction of the bus line of the roller. Thus, in spite of the depth of focus of the small-diameter imaging element array 13 being shallow, original reading at high accuracy becomes possible.

An advantage resulting from movably supporting the original reading assembly 9 is that it becomes easy to remove the original whenever it is jammed on the platen roller 8. In the previously described embodiment, a manually operated lever or knob 45 is fixed to the arm 41b. This knob 45 is projected outwardly through a slot provided in a cover 21b for the upper portion of the body. When the original is jammed on the roller 8, if the operator manually moves the knob 45 clockwise (as viewed in FIG. 6), the reading assembly 9 will become spaced apart from the roller 8, that is, the original holding-down plate 10 will become spaced apart from the roller, whereby removal of the original jammed on the roller 8 will be readily permitted.

As previously described, the original reading assembly 9 is disposed substantially at the back of the platen roller 8 with respect to the direction in which the original is guided by the guide 4. A recording head 20 is disposed substantially at the back of the assembly 9 with respect to the direction in which the original is guided by the guide 4. Further, a recording medium containing portion is provided substantially at the back of the recording head 20 with respect to the direction in which the original is guided by the guide 4. Thus, compactness of the apparatus is achieved. As previously mentioned, the original reading assembly 9 is provided obliquely upwardly of the platen roller 8. The recording head 20 is disposed obliquely upwardly of this assembly. The original conveying means including the platen roller 8, the assembly 9, the recording head 20 and the recording medium containing portion are contained in a box member 26, the upper portion 21 of which is inclined upwardly with respect to the direction in which the original is guided by the guide 4. In other words, from the apparatus rearward portion in which the recording medium containing portion is provided toward the apparatus forward portion in which the original insertion port 1 is provided, the upper portion 21 of the apparatus forms a downwardly inclined surface to facilitate the handling of the apparatus.

Figure 10:
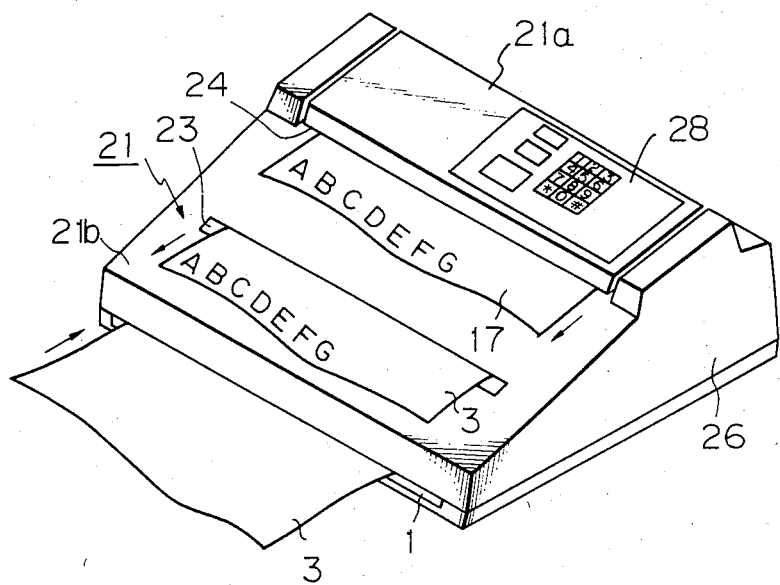
FIG. 10 is a perspective view of an embodiment of the present invention in operation.

An operating panel 28 is provided on the part 21a of the upper portion 21 of the apparatus, as shown in FIG. 10. An operation mode selecting key, a start key, numeric keys, etc. are provided on the panel 28. A discharge port 24 for recording medium is provided at the lower end of the part 21a. A discharge port 23 for originals is provided in the part 21b of the upper portion of the apparatus. Thus, the upper portion 21 of the apparatus serves as both a receiving tray for originals discharged from the discharge port 23 and a receiving tray for recording medium discharged from the discharge port 24. The original is discharged with its surface to be read facing upwardly, and the recording medium is discharged with its recording surface facing upwardly.

The part 21a is pivotably mounted on the body by a shaft 27 (FIG. 2) and therefore, by manually pivoting 21a in the direction of arrow C, the recording medium containing portion can be opened and a new recording medium can be set on a recording medium holder 18.

Figure 11:
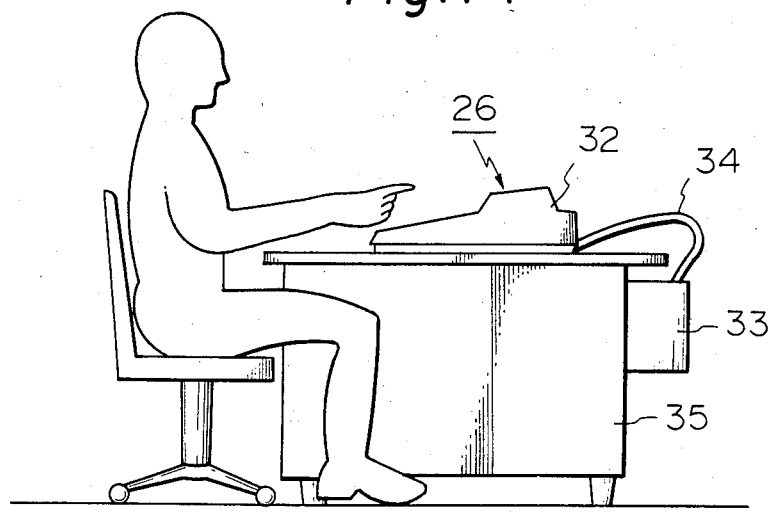
FIG. 11 illustrates an example of the use of an embodiment of the present invention.

Thus, loading of recording medium, insertion of originals, removal of discharged originals and recording medium and key operations can all be accomplished by the operator while sitting on a chair as shown in FIG. 11, and the apparatus can be installed on a desk 35 on which it is easy to work. The panel 28 can be seen, and the correctness of one's operation of it, visually confirmed with ease.

The recording medium 17, which is thermosensitive paper, is loaded on the holder 18 while wound in the form of a roll. This recording medium 17 is conveyed by the rotation of a recording platen roller 19 toward the forward portion of the apparatus, namely, in the direction substantially opposite to the direction in which the original is conveyed by the guide 4. The head 20, which is a thermal head, is driven correspondingly to an electrical signal formed by the assembly 9 or correspondingly to the information signal from other transmitter, and reproduces the image of the original on the recording medium 17. The recording medium 17 on which recording has been effected is cut by a cutter 25 provided at the part 21a. In order to nip the recording medium 17 between the head 20 and the platen roller 19, the head 20 is resiliently urged against the roller 19 by a spring 22 provided at the part 21a. The head 20 may be provided at the part 21a or on a fixed chassis, not shown.

The recording portion such as the recording head 20 is disposed obliquely upwardly of the reading assembly 9 and therefore, when a copying operation has been effected, the radiant heat of the assembly 9 directly reaches the recording portion and assists the heating state of the recording head 20 which effects thermal recording.

Figure 12:
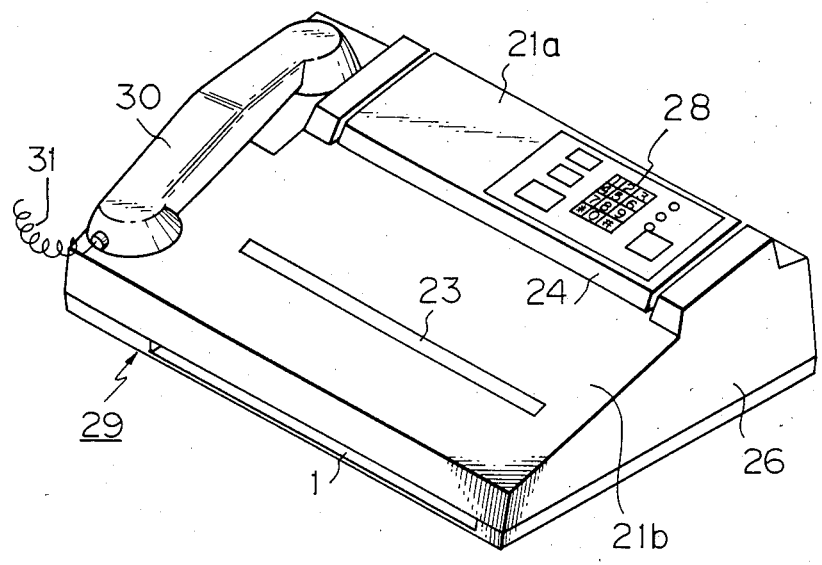
FIG. 12 is a perspective view of another embodiment of the present invention.

Now, the conventional facsimile apparatus has been separate from a telephone set and therefore, a larger space has been required for the installation of the apparatus body and the telephone set, but in the present embodiment, as shown in FIG. 12, a telephone set 29 is mounted at one side of the apparatus body 26, namely, sideways of the recording medium 17 and the original conveyance path, whereby the telephone set can be contained unitarily.

Figure 13:
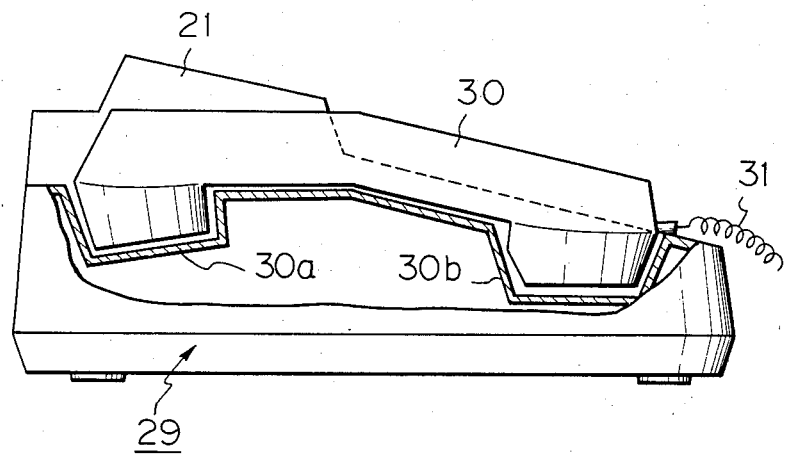
FIG. 13 is a side view of the FIG. 12 embodiment with a portion thereof broken away.

In the present apparatus, the entire body is compact and the surface of the upper cover is forwardly inclined and therefore, when the handset 30 of the telephone set 29 is laid down, the external shape of the handset 30 becomes substantially coincident with the shape of the apparatus as shown in FIG. 13. Accordingly, in the present apparatus, the telephone set 29 can be mounted unitarily without the compactness of the entire body being sacrificed.

In the foregoing case, the handset 30 of the telephone set 29, if bent at the middle thereof as shown in FIG. 13, will become more coincident with the shape of the apparatus and the entire body will be in better union.

Further, the telephone set 29 may be disposed at either the right or the left side of the apparatus body 26, but assuming that the operation panel 28 of the present apparatus is operated by the right hand, the telephone set will be easier to use if mounted at the left side, because there will be no intersection of the hand with the telephone cord 31.

Supporting recesses 30a and 30b for supporting the handset 30 when placed on the apparatus are provided in the upper portion of the apparatus.

Description will now be made of an embodiment in which compactness of the apparatus is more sought after.

For example, in a facsimile apparatus, the functions usually required by the operator of the apparatus are a telephone set, an original reading system and a recording system for effecting printing or recording on a recording medium, or in other words, a portion for inputting and outputting information (hereinafter referred to as the "I/O portion"). Accordingly, it will suffice if only the I/O portion is present on a desk.

If, in view of the above-noted point, a construction is adopted in which, as shown in FIG. 11, only the I/O portion 32 of the apparatus is contained in the apparatus body 26 and other electric system functions, such as a power source for operating the apparatus, an NCU and a system control unit, are contained in an electric system box 33 and the apparatus body 26 and the electric system box 33 are connected together by a relay cable 34, then the apparatus body 26 can be made very compact.

In this case, the electric system box 33 may be installed somewhere around a desk 35, for example, at a side of the desk 35, and need not be placed on the desk 35 and therefore, the occupation space on the desk 35 can be reduced.

In the foregoing case, if either end of the relay cable 34 is connected by a connector, it will be convenient for installation or maintenance of the apparatus.

Description will now be made of an embodiment in which the upper guide 15 is constructed of a resilient member.

If in carrying out the present invention, a spring plate of a small thickness or a resilient member such as a Mylar sheet is used as the upper guide 15 and is spot-welded to a support member or paper discharge stay 41 or adhesively secured thereto by a tape with two adhesive sides, or the like, any positional deviation of the reading assembly 9 can be absorbed by the resiliency of the upper guide 15 even if the upper guide 15 comes into contact with the reading assembly 9. Accordingly, any error of the reading focus of the reading assembly 9 can be prevented from occurring. Accordingly, the upper guide 15 can be positively made proximate to the reading assembly 9, or as shown in FIG. 14, the upper guide can be mounted in direct contact with the small sensor 9.

If the upper guide 15 is constructed of a resilient member as described above, it will become unnecessary to provide a gap between the upper guide 15 and the reading assembly 9 and therefore, the original 3, after being read, can be smoothly guided by the upper guide 15 and occurrence of flapping or jamming of the original 3 can be prevented.

Also, where the upper guide 15 is constructed of a resilient member, the paper discharge stay 41 can be brought into intimate contact with the reading platen roller 8 as shown in FIG. 15, and at this time, by providing the relation that the friction coefficient between the paper discharge stay 41 and the original 3 is smaller than the friction coefficient between the original 3 and the reading platen roller 8, the original 3 can be discharged without using a back-up roller 16.

Accordingly, the space otherwise occupied by the back-up roller can be eliminated, and correspondingly, the apparatus can be made compact.

Description will now be made of a side stopper for aligning and guiding the side edge of the original when inserted into the insertion port.

Figure 16:
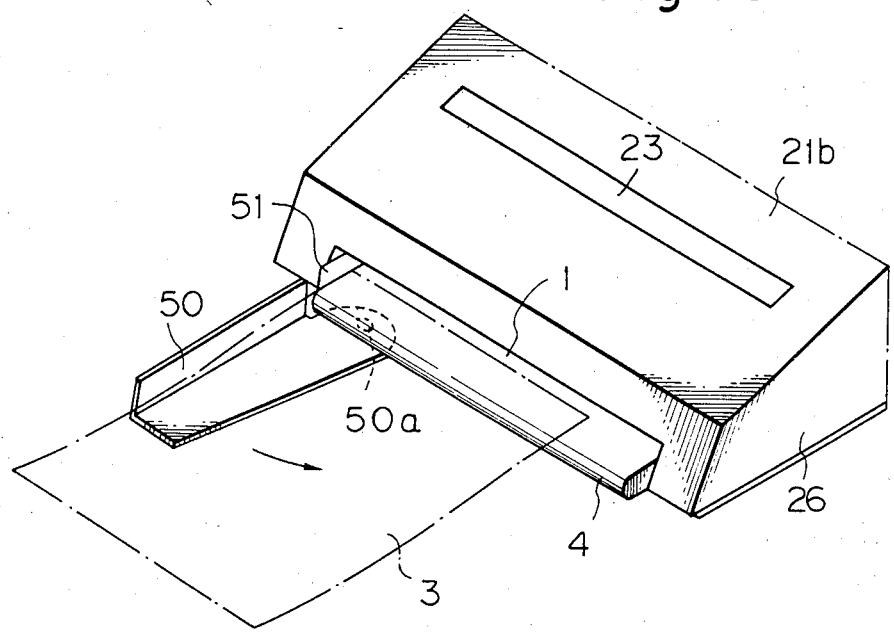
FIGS. 16 and 17 are fragmentary perspective views of a preferred embodiment of the present invention.

In FIG. 16, reference numeral 50 designates a side stopper in the form of an L-shaped plate. The side stopper 50 is projected from the front face of the apparatus and is pivotally supported at a predetermined location on the lower frame of the apparatus through a support shaft 50a so as to be pivotable close to the upper surface of an apparatus supporting table. The original 3, as shown in FIG. 16, can be set with one side edge thereof resting on and bearing against the side stopper 50 and with the leading end thereof resting on the lower guide 4 and most of the remaining part thereof resting on the surface of the table.

Figure 17:
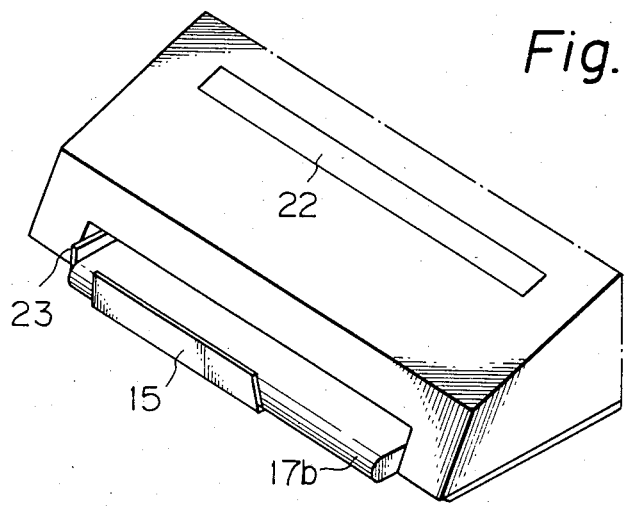

As shown in FIG. 17, the side stopper 50 can be horizontally pivoted and tucked into the front portion of the apparatus to close the insertion port 1 and thereby block the insertion of the original and eliminate the protrusion of the apparatus and also, the space of the table is widened so that this portion can be used for other works. Designated by 51 is an auxiliary side stopper provided in the interior of the original feeding portion of the apparatus correspondingly to the side stopper 50.

Figure 18:
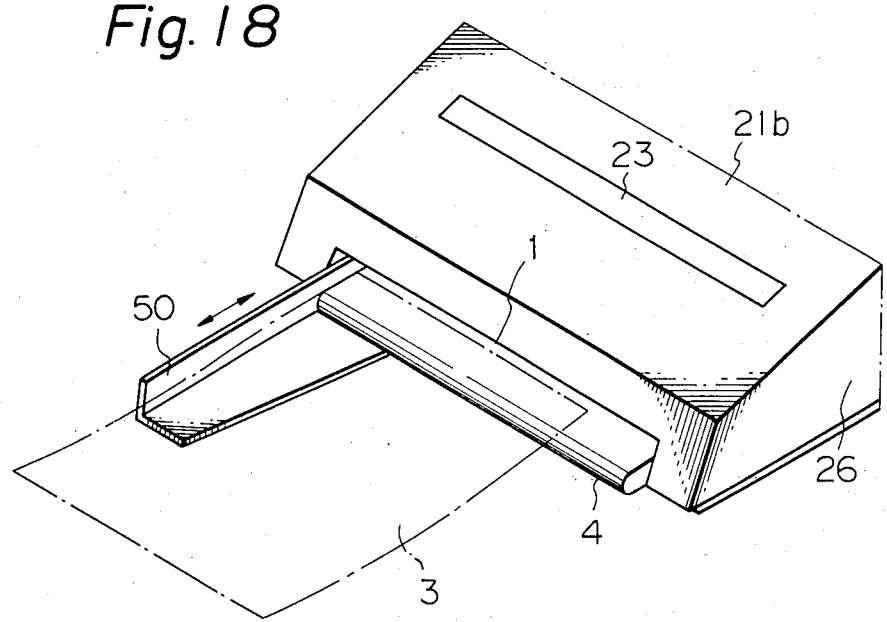
FIGS. 18 and 19 are fragmentary perspective views of another preferred embodiment of the present invention.
Figure 19:
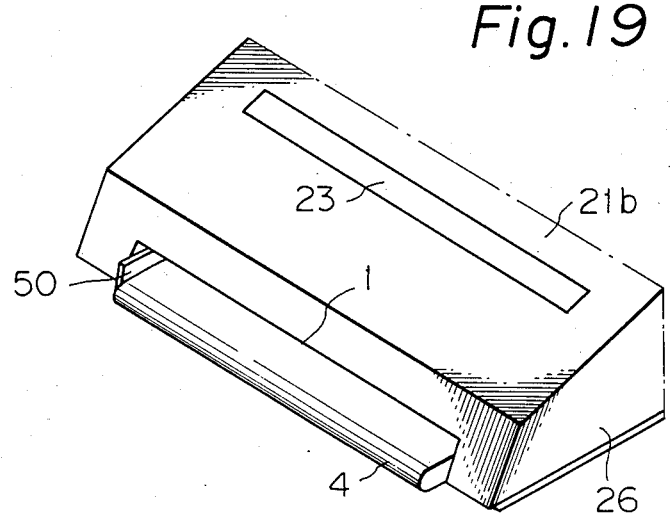

In the above-described embodiment, the side stopper 50 is constructed for pivotal movement through the support shaft 50a so as to be tucked into the front portion of the apparatus, but it is also possible to slidably mount the side stopper 50 in the apparatus through a sliding device such as a guide groove as shown in FIGS. 18 and 19 so that the side stopper may be contained in the apparatus during the non-use thereof. The side stopper 50 in the above-described embodiment is not limited to the shown examples, but it may be constituted by positioning members of various structures, such as a member having rising pieces on the opposite side edges thereof and a member of the drawer type which has a rising surface also at the front thereof.

What is claimed is:

1. A original reading apparatus comprising:
   a platen roller for conveying an original, the back side of the original being opposed to said platen roller;
   a reading assembly having a solid state image sensor for converting the optical image of the original into an electrical signal, an imaging optical system for forming the optical image of the original on said solid state image sensor, said imaging optical system comprising an array of a plurality of small imaging elements, an original holding-down member for holding down the original against said platen roller, and a base member for supporting said solid state image sensor, said imaging optical system and said original holding-down member;
   a first arm;
   means for fixing one end of said reading assembly to said first arm;
   a second arm;
   means for relatively movably engaging the other end of said reading assembly with said second arm;
   means for pivotably supporting said first and second arms; and
   biasing means for resiliently biasing said reading assembly toward said platen roller so that said imaging optical system is opposed to said platen roller and said original holding-down member bears against said platen roller.

2. An apparatus according to claim 1, wherein said imaging optical system is opposed to said platen roller at a position downstream of the position at which said original holding-down member bears against said platen roller, with respect to the direction of conveyance of the original.

3. An apparatus according to claim 2, wherein said original holding-down member is a plate-like member, and said imaging optical system is opposed to said platen roller at a position immediately rearward of said original holding-down member.

4. An apparatus according to claim 1, wherein said reading assembly has original illuminating means supported by said base member.

5. An apparatus according to claim 4, wherein said illuminating means is a light-emitting diode array.

6. An apparatus according to any one of claims 1 to 5, further comprising original supply means for supplying the original to the lower portion of said platen roller, and wherein the original is conveyed from the lower portion of said platen roller to the upper portion thereof and is separated from said platen roller at the upper portion thereof, and said imaging optical system is oriented so as to be opposed to the original at the upper portion of said platen roller and such that the optical axis of said imaging optical system faces obliquely downwardly relative to said platen roller.

7. An apparatus according to claim 6, further including operating means for spacing said reading assembly apart form said platen roller.

8. An apparatus according to any one of claims 1 to 5, further including operating means for spacing said reading assembly apart from said platen roller.

9. An original reading and recording apparatus comprising:
   a platen roller for conveying an original;
   an original insertion port;
   guide means for guiding the original from said original insertion port toward said platen roller;
   original reading means disposed at a position substantially at the back of said platen roller with respect to the direction in which the original is guided by said guide means, said original reading means being provided with a solid state image sensor for converting the optical image of the original into an electrical signal, and an imaging optical system for forming the optical image of the original on said solid state image sensor, said imaging optical system comprising an array of plurality of small imaging elements and being disposed in opposed relationship with said platen roller;
   recording means disposed substantially at the back of said original reading means with respect to the direction in which the origianl is guided by said guide means, said recording means being adapted to form an image on a recording medium correspondingly to a received image signal;
   recording medium containing portion provided at a position substantially at the back of said recording means with respect to the direction in which the original is guided by said guide means, said recording medium containing portion being adapted to contain therein a recording medium wound in the form of a roll, the recording medium being supplied from said containing portion to said recording means; and
   original supply means for supplying the original to the lower portion of said platen roller,
   wherein the original is conveyed from the lower portion of said platen roller to the upper portion thereof and is separated from said platen roller at the upper portion thereof, said imaging optical system being oriented so as to be opposed to the original at the upper portion of said platen roller and such that the optical axis of said imaging optical system faces obliquely downwardly relative to said platen roller, and
   wherein said original reading means is opposed to the upper portion of said platen roller, said recording means is disposed obliquely upwardly of said original reading means, and said apparatus has a box member covering said platen roller, said reading means, said recording means and said recording medium containing portion, the upper portion of said box member being upwardly inclined with respect to the direction in which the original is guided by said guide means; and said box member comprising said original insertion port, an original discharging port, and a recording material discharging port, said original discharging port being disposed between said original insertion port and said recording material discharging port, the original discharging direction from said original discharging port and the recording material discharging direction from said recording material discharging port being substantailly opposite to the original insertion direction into said original insertion port.

10. An apparatus according to claim 9, wherein the support portion of a telephone handset is provided on the upper portion of said box member.

11. An apparatus according to claim 9, further comprising:
   an original holding-down member for holding down the original against said platen roller;
   a base member for supporting said original reading means and said original holding-down member;
   means for movably supporting said base member; and
   biasing means for resiliently biasing said base member toward said platen roller so that said original holding-down member bears against said platen roller and said original reading means is opposed to said platen roller.

12. An original reading apparatus comprising:
   a platen roller for conveying an original to be read;
   a reading assembly having a solid state image sensor for generating an electrical signal corresponding to the original;
   a first arm;
   means for fixing one end of said reading assembly to said first arm;
   a second arm;
   means for relatively movably engaging the other end of said reading assembly with said second arm;
   means for pivotably supporting said first and second arms; and
   biasing means for resiliently biasing said reading assembly toward said platen roller.

* * * * *

UNITED STATES PATENT AND TRADEMARK OFFICE
CERTIFICATE OF CORRECTION

PATENT NO. : 4,729,036

DATED : March 1, 1988

INVENTOR(S) : TAKESHI IKEDA, ET AL.

It is certified that error appears in the above-identified patent and that said Letters Patent is hereby corrected as shown below:

COLUMN 2

Line 36, "speed. The" should read --speed, the--.

COLUMN 4

Line 27, "FIG. 5B" should read --FIG. 5B,--.
    Line 29, "axis p" should read --axis P--.
    Line 32, "downwardly" should read --downwardly,--.

COLUMN 5

Line 12, "assembly 9 in" should read --assembly 9 (as viewed in--.
    Line 13, "thereof" should read --thereof)--.
    Line 61, "a" should be deleted.

COLUMN 9

Line 16, "A original" should read --An original--.

COLUMN 10

Line 5, "form" should read --from--.
    Line 29, "origianl" should read --original--.
    Line 33, "recording" should read --a recording--.

UNITED STATES PATENT AND TRADEMARK OFFICE
CERTIFICATE OF CORRECTION

PATENT NO. : 4,729,036

DATED : March 1, 1988

INVENTOR(S) : TAKESHI IKEDA, ET AL.

It is certified that error appears in the above-identified patent and that said Letters Patent is hereby corrected as shown below:

COLUMN 11

Line 3, "substantailly" should read --substantially--.

Signed and Sealed this

Second Day of August, 1988

Attest:

DONALD J. QUIGG

Attesting Officer

Commissioner of Patents and Trademarks